(12) United States Patent
Kim

(10) Patent No.: US 8,999,545 B2
(45) Date of Patent: Apr. 7, 2015

(54) BATTERY MODULE

(75) Inventor: Myung-Chul Kim, Yongin-si (KR)

(73) Assignees: Samsung SDI Co., Ltd., Yongin-si (KR); Robert Bosch GmbH, Stuttgart (DE)

( * ) Notice: Subject to any disclaimer, the term of this patent is extended or adjusted under 35 U.S.C. 154(b) by 170 days.

(21) Appl. No.: 13/187,377

(22) Filed: Jul. 20, 2011

(65) Prior Publication Data

US 2012/0270095 A1 Oct. 25, 2012

(30) Foreign Application Priority Data

Apr. 21, 2011 (KR) .................. 10-2011-0037305

(51) Int. Cl.

| H01M 2/10 | (2006.01) |
|---|---|
| H01M 6/46 | (2006.01) |
| H01M 2/00 | (2006.01) |
| H01M 10/625 | (2014.01) |
| H01M 10/647 | (2014.01) |
| H01M 10/6556 | (2014.01) |
| H01M 10/04 | (2006.01) |

(52) U.S. Cl.
CPC ........ *H01M 2/1077* (2013.01); *H01M 10/0468* (2013.01); *H01M 10/5016* (2013.01); *H01M 10/5032* (2013.01); *H01M 10/5057* (2013.01)

(58) Field of Classification Search
USPC ........... 429/99, 100, 159, 163, 120, 149, 151, 429/154, 176; 3/99, 100, 159, 163, 120, 3/149, 151, 154, 176
See application file for complete search history.

(56) References Cited

U.S. PATENT DOCUMENTS

| 5,585,204 | A | 12/1996 | Oshida et al. | |
|---|---|---|---|---|
| 5,620,057 | A | 4/1997 | Klemen et al. | |
| 6,183,903 | B1 | 2/2001 | Campbell et al. | |
| 6,586,132 | B1 * | 7/2003 | Fukuda et al. ................ | 429/120 |
| 7,989,104 | B2 * | 8/2011 | Jeon et al. ..................... | 429/159 |
| 8,216,502 | B2 * | 7/2012 | Hermann et al. ........ | 264/272.21 |
| 2002/0015880 | A1 | 2/2002 | Heimer | |
| 2006/0115720 | A1 * | 6/2006 | Kim .............................. | 429/156 |
| 2010/0136461 | A1 | 6/2010 | Tsujiko et al. | |
| 2010/0215998 | A1 * | 8/2010 | Byun et al. ...................... | 429/82 |
| 2011/0014512 | A1 | 1/2011 | Amagai et al. | |

FOREIGN PATENT DOCUMENTS

| EP | 1 610 407 A1 | 12/2005 |
|---|---|---|
| JP | 2002-26748 | 1/2002 |
| JP | 200226748 | * 1/2002 |
| JP | 2005-302590 | 10/2005 |
| JP | 2007-299544 A | 11/2007 |

(Continued)

OTHER PUBLICATIONS

EPO Office action dated Jul. 16, 2012 issued in European Patent Application No. 11190419.9, 5 pages.

(Continued)

*Primary Examiner* — Ula C. Ruddock
*Assistant Examiner* — Thomas H. Parsons
(74) *Attorney, Agent, or Firm* — Christie, Parker & Hale, LLP

(57) ABSTRACT

A battery module including a plurality of battery cells aligned in a direction; first and second end plates respectively arranged at outer sides of the plurality of battery cells; and a bottom plate supporting bottom surfaces of the battery cells and including at least a portion including a pattern structure.

14 Claims, 10 Drawing Sheets

(56) References Cited

FOREIGN PATENT DOCUMENTS

| | | | |
|---|---|---|---|
| JP | 2011-23301 | | 2/2011 |
| KR | 10-2001-0024892 | | 3/2001 |
| KR | 10-2009-0000297 | | 1/2009 |
| KR | 2009-0130328 A | | 12/2009 |
| KR | 2010-0111307 A | | 10/2010 |
| WO | WO2008074034 | * | 6/2008 |

OTHER PUBLICATIONS

Korean Office action dated Sep. 2, 2012, issued in Korean Application No. 10-2011-0037305, 7 pages.
KIPO Notice of Allowance dated Mar. 12, 2013, for Korean priority Patent application 10-2011-037305, (1 page).
EPO Office action dated Oct. 24, 2014, for corresponding European Patent application 11190419.9, (4 pages).

* cited by examiner

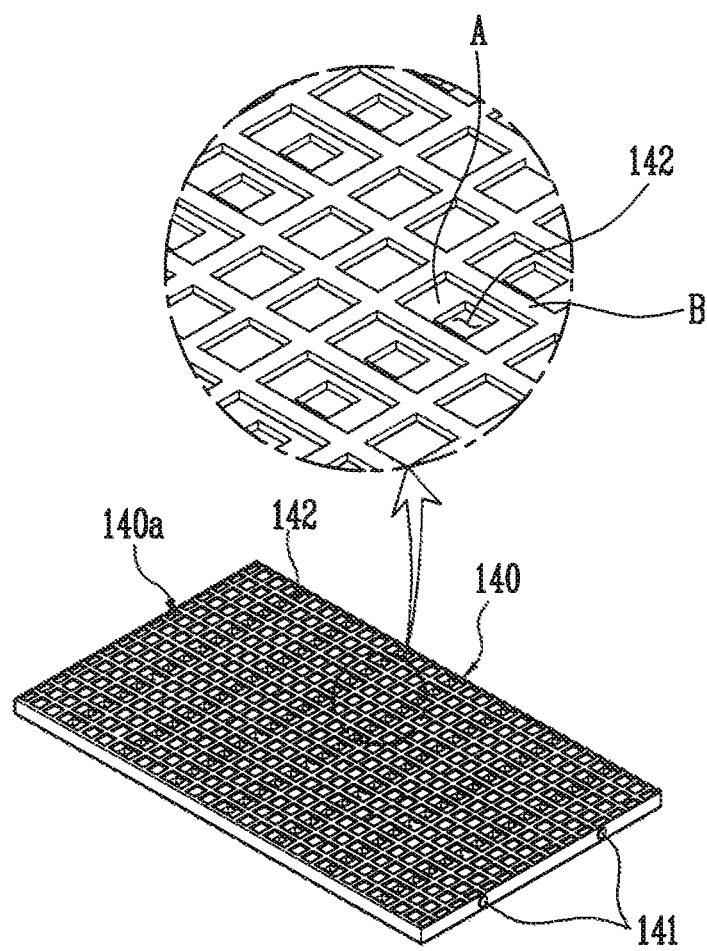

BATTERY MODULE

CROSS-REFERENCE TO RELATED APPLICATION

This application claims priority to and the benefit of Korean Patent Application No. 10-2011-0037305, filed on Apr. 21, 2011 in the Korean Intellectual Property Office, the entire content of which is incorporated herein by reference.

BACKGROUND

1. Field

Aspects of embodiments of the present invention relate to a battery module.

2. Description of the Related Art

A high-power battery module using a non-aqueous electrolyte with high energy density has recently been developed. The high-power battery module is configured as a large-capacity battery module manufactured by connecting a plurality of battery cells in series such that it may be used in driving motors of devices requiring high power, such as hybrid vehicles, electric vehicles, and the like.

A battery cell includes an electrolyte and an electrode assembly composed of a positive electrode plate and a negative electrode plate, and generates energy through an electrochemical reaction of the positive and negative electrode plates and the electrolyte. In this instance, gas may be generated as a side reaction of the electrochemical reaction in the interior of the battery cell. The generated gas may change the external shape of the battery cell. Further, the change in the external shape of the battery cell may affect the shape of a battery module formed by aligning a plurality of battery cells, and may result in the battery cells not being firmly fixed in the battery module. Battery modules having various shapes have been developed so as to reduce the change in the external shape of the battery cells and to improve productivity of the battery modules.

SUMMARY

According to an aspect of embodiments of the present invention, a battery module includes a novel plate member, thereby decreasing the size and/or weight of the battery module. As such, battery modules according to embodiments of the present invention are particularly applicable as a motor-driving power source for propelling hybrid vehicles or electric vehicles.

According to another aspect of embodiments of the present invention, a battery module has improved productivity due to a manufacturing process thereof.

According to an embodiment of the present invention, a battery module includes: a plurality of battery cells aligned in a direction; first and second end plates respectively arranged at outer sides of the plurality of battery cells; and a bottom plate supporting bottom surfaces of the battery cells and including at least a portion including a pattern structure.

The bottom plate may include a plastic material.

The pattern structure may include a honeycomb structure.

The pattern structure may include at least one recessed portion on a bottom surface of the bottom plate, and a protruding portion surrounding an outer circumference of the at least one recessed portion.

The bottom plate may have at least one opening formed therethrough. The at least one opening may be formed through the at least one recessed portion of the pattern structure.

The battery module may further include a barrier between adjacent battery cells of the plurality of battery cells, wherein the at least one opening is at a location corresponding to the barrier.

The bottom plate may include a base portion facing the bottom surfaces of the battery cells, and at least one flange portion extending at an angle from at least one side of the base portion and facing side surfaces of the battery cells.

In one embodiment, the at least one flange portion includes first and second flange portions respectively extending from opposite sides of the base portion, and the first and second flange portions extend between the first and second end plates and overlap at least portions of the side surfaces of the battery cells.

The pattern structure may be formed on a second surface of the base portion opposite a first surface of the base portion which faces the bottom surfaces of the battery cells.

The pattern structure may include recesses having at least one of a hexagonal shape, a triangular shape, a rectangular shape, or a circular shape.

The pattern structure may include a repetitive pattern structure.

In one embodiment, the bottom plate includes a guide portion at a location corresponding to a position of a battery cell of the plurality of battery cells, and the guide portion faces the battery cell to guide the battery cell into the position.

In one embodiment, at least one of the first and second end plates has a first fastening hole at a portion that contacts an end of the bottom plate, and the bottom plate has a second fastening hole at a location corresponding to the first fastening hole.

The battery module may further include fastening members in the first and second fastening holes and fastening the first and second end plates to the bottom plate.

The fastening members may include bolts or studs.

The battery module may further include a connecting member connecting the first and second end plates to each other.

The connecting member may include side plates respectively supporting opposite side surfaces of the battery cells.

According to aspects of embodiments of the present invention, a battery module is lightweight and includes a novel plate member.

Also, according to another aspect of embodiments of the present invention, productivity of a battery module is increased due to an improved manufacturing process thereof.

BRIEF DESCRIPTION OF THE DRAWINGS

The accompanying drawings, together with the specification, illustrate some exemplary embodiments of the present invention, and, together with the description, serve to explain principles of the present invention.

FIG. 3B is a bottom perspective view of a bottom plate of the battery module of FIG. 1.

DETAILED DESCRIPTION

Figure 1:
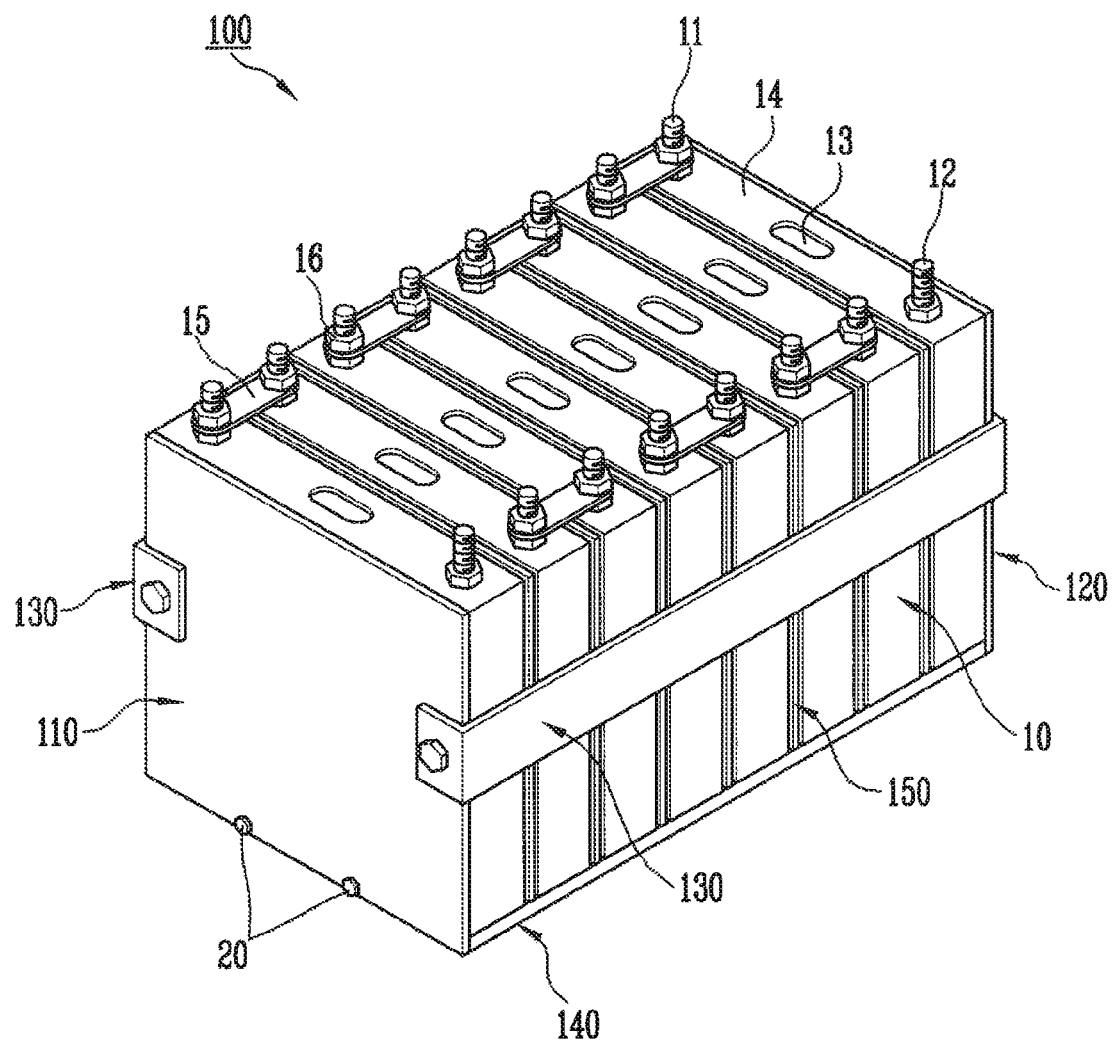
FIG. 1 is a perspective view of a battery module according to an embodiment of the present invention.

In the following detailed description, some exemplary embodiments of the present invention are shown and described, by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the another element or be indirectly on the another element with one or more intervening elements interposed therebetween. Also, when an element is referred to as being "connected to" another element, it can be directly connected to the another element or be indirectly connected to the another element with one or more intervening elements interposed therebetween. Hereinafter, like reference numerals refer to like elements.

Some exemplary embodiments of the present invention are described below with reference to the accompanying drawings.

Figure 2:
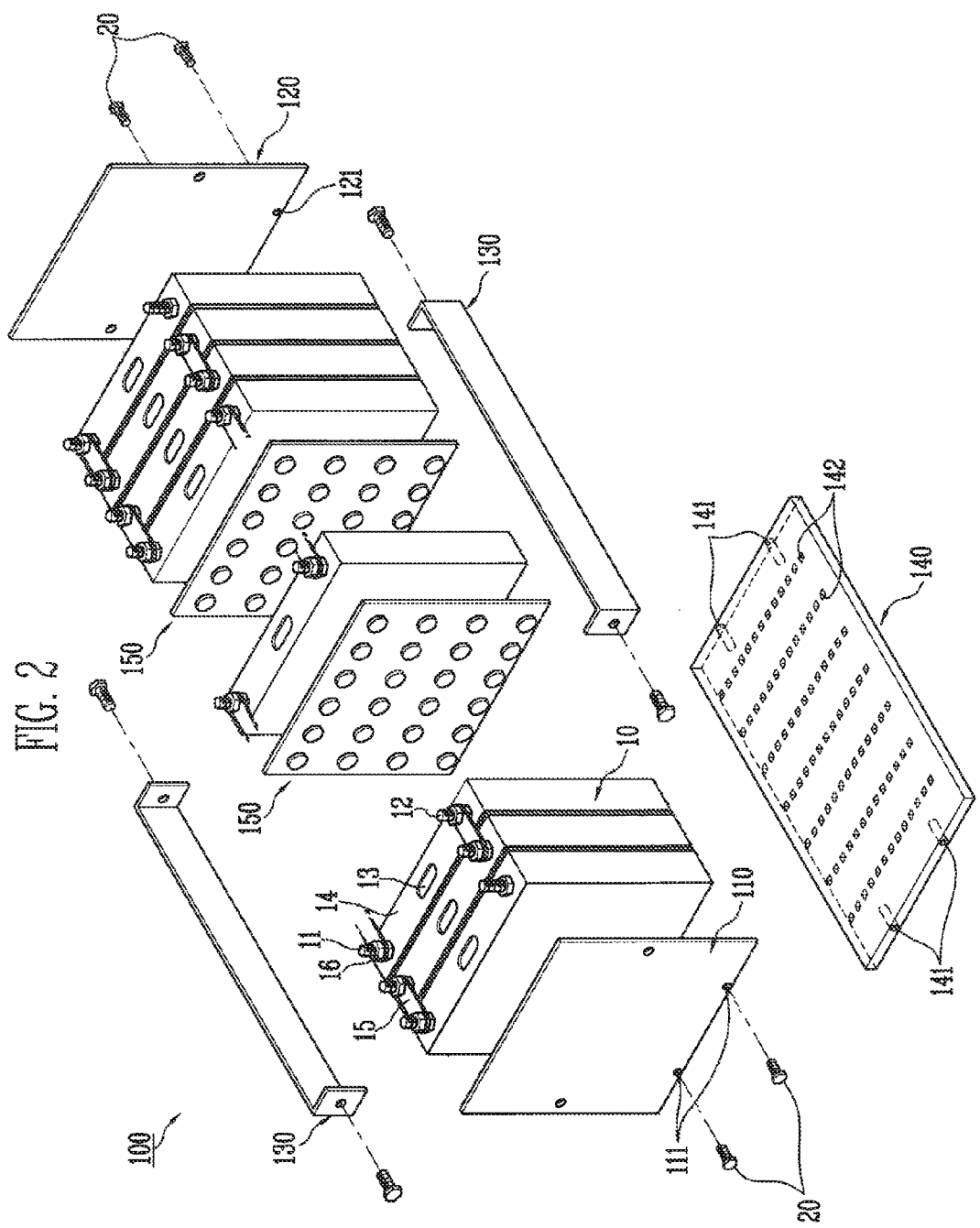
FIG. 2 is a partially exploded perspective view of the battery module of FIG. 1.

FIG. 1 is a perspective view of a battery module according to an embodiment of the present invention. FIG. 2 is a partially exploded perspective view of the battery module of FIG. 1.

Referring to FIGS. 1 and 2, a battery module 100 according to an embodiment of the present invention includes a plurality of battery cells 10 aligned in one direction; first and second end plates 110 and 120 respectively disposed at outsides of the battery cells 10; and a bottom plate 140 that supports bottom surfaces of the battery cells 10 and has at least a portion having a pattern structure (e.g., a repetitive pattern structure).

The battery cell 10 may be manufactured by accommodating an electrode assembly and an electrolyte in a battery case and then sealing the battery case with a cap plate 14. The cap plate 14 may include positive and negative electrode terminals 11 and 12 at respective ends on the cap plate 14, and a vent 13 between the positive and negative electrode terminals 11 and 12. The electrode assembly may be composed of a positive electrode plate, a negative electrode plate, and a separator interposed between the positive and negative electrode plates. The positive electrode plate is connected to the positive electrode terminal 11, and the negative electrode plate is connected to the negative electrode terminal 12. Energy generated by an electrochemical reaction between the electrode assembly and the electrolyte is transferred to the outside of the battery cell 10 via the positive and negative electrode terminals 11 and 12. The vent 13 serves as a path through which gas generated inside the battery cell 10 may be exhausted to the outside of the battery cell 10.

The pair of the first and second end plates 110 and 120 and the bottom plate 140 provide a space for accommodating the plurality of battery cells 10. The battery cells 10 may be fixed in the space defined by the first and second end plates 110 and 120 and the bottom plate 140 by being accommodated in the space and aligned in one direction. In one embodiment, the battery cells 10 are aligned in parallel such that wide lateral surfaces (e.g., front and rear surfaces) of the battery cells 10 are opposite one another. The positive and negative electrode terminals 11 and 12 of two neighboring battery cells 10 may be electrically connected to each other through a bus bar 15. The bus bar 15 is provided with holes through which the positive and negative electrode terminals 11 and 12 penetrate, respectively. The bus bar 15 and the positive and negative electrode terminals 11 and 12 connected thereto may be fixed together by members such as nuts 16.

The first and second end plates 110 and 120, in one embodiment, may be disposed to contact outer surfaces of the outermost battery cells 10, respectively. Thus, in one embodiment, the first and second end plates 110 and 120 apply pressure in an inward direction to the plurality of battery cells 10. In one embodiment, the plurality of battery cells 10 supported by the first and second end plates 110 and 120 and the bottom plate 140 may be connected in series to one another by alternately aligning the positive and negative electrode terminals 11 and 12.

In one embodiment, the first and second end plates 110 and 120 may be provided with first fastening holes 111 and 121 respectively formed at portions of the first and second end plates 110 and 120 that come in contact with respective ends of the bottom plate 140. Further, the bottom plate 140 may be provided with second fastening holes 141 respectively formed at portions of the bottom plate 140 corresponding to the first fastening holes 111 and 121 of the first and second end plates 110 and 120.

The first and second fastening holes 111, 121, and 141, in one embodiment, are penetrated by fastening members 20 for fastening the first and second end plates 110 and 120 to the bottom plate 140. That is, the first fastening holes 111 and 121, and the second fastening holes 141 respectively provided corresponding to the first fastening holes 111 and 112 are extended to each other, and the fastening members 20 penetrate the first and second fastening holes 111, 121, and 141 for connecting the bottom plate 140 to the first and second end plates 110 and 120. For example, the fastening member 20 may include a bolt, a stud, or any other suitable threaded member or other fastening member.

As described above, the fastening through the first and second fastening holes 111, 121, and 141 provides a simplified external appearance of the battery module 100 and also decreases an overall size of the battery module 100. Further, the first and second fastening holes 111, 121, and 141 effectively disperse stress generated by the plurality of battery cells 10, which is concentrated on the bottom plate 140, thereby improving the safety of the battery module 100.

The battery module 100 may further include one or more connecting members 130. As described above, in one embodiment, the plurality of battery cells 10 may be configured as the battery module 100 together with the first and second end plates 110 and 120 and the bottom plate 140, and the connecting member 130 may be absent. However, in another embodiment, the battery module 100 further includes the connecting member 130 connecting the first and second end plates 110 and 120 to each other, such that the plurality of battery cells 10 may be more firmly fixed. For example, the connecting member 130 may include side plates that respectively support one or both side surfaces of the battery cells 10.

The first and second end plates 110 and 120, the bottom plate 140, and, in one embodiment, the connecting member 130 including the side plates or the like, make up a housing for stably fixing the plurality of battery cells 10, and the shape and/or number of plates of the housing may be variously modified according to a design of the battery module 100. That is, a housing of the battery module of the present invention is not limited to the configuration of the embodiment shown in FIGS. 1 and 2.

Figure 3A:
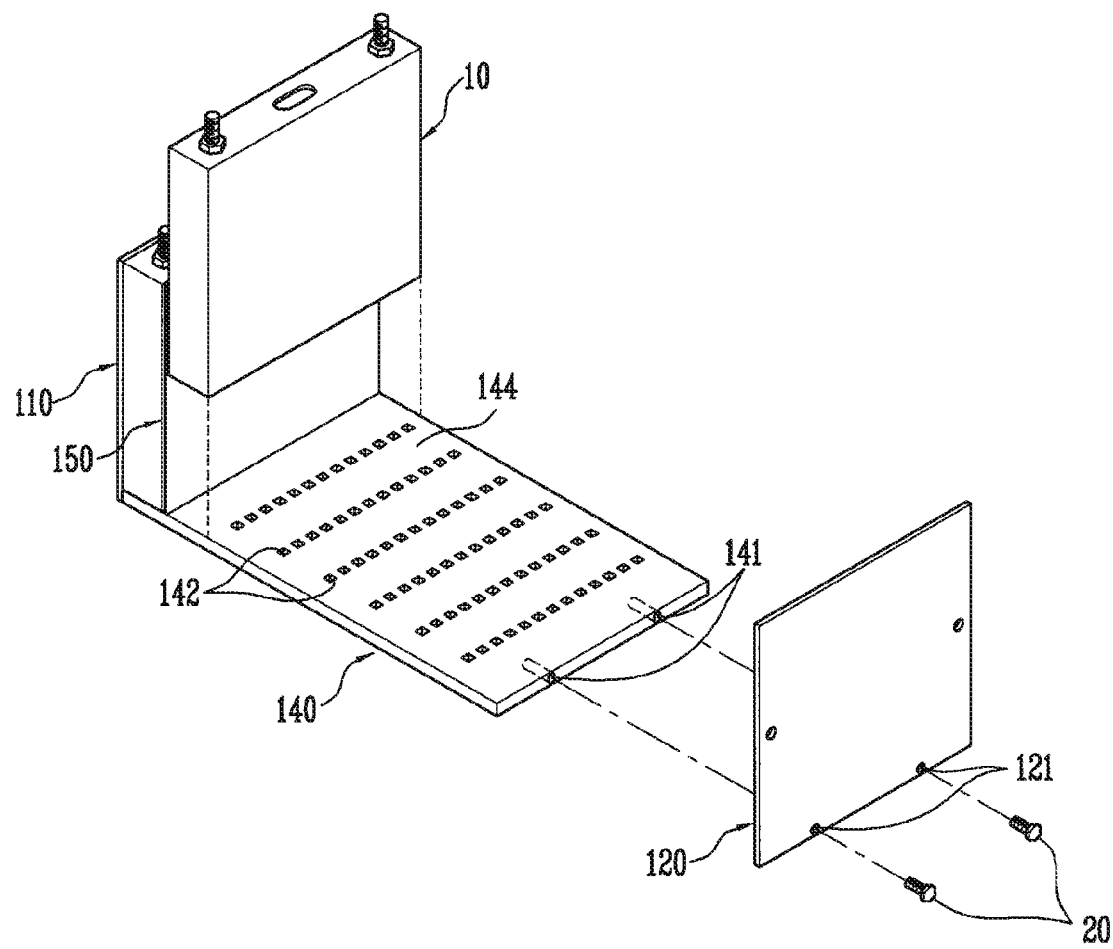
FIG. 3A is a partially exploded perspective view of some components of the battery module of FIG. 1.

FIG. 3A is a partially exploded perspective view showing some components, including the end plates 110 and 120 and the bottom plate 140, of the battery module 100. FIG. 3B is a bottom perspective view of the bottom plate 140 according to an embodiment of the present invention.

Referring to FIGS. 3A and 3B, in one embodiment, the bottom plate 140 supports the bottom surfaces of the battery cells 10, and at least a portion of the bottom plate 140 is configured having a pattern structure 140a. In one embodiment, the bottom plate 140 has a top surface 144 supporting the battery cells 10. The bottom plate 140 may include one or more openings 142. In one embodiment, the bottom plate 140 may include a plurality of the openings 142 arranged in a pattern, such as a repetitive pattern.

The pattern structure 140a may include one or more recessed portions A (e.g., concave portions) provided on a bottom surface of the bottom plate 140 and one or more protruding portions B (e.g., pillar portions) provided around, such as surrounding, an outer circumference of one or more of the recessed portions A. In one embodiment, the one or more openings 142 may be provided in one or more of the recessed portions A of the pattern structure 140a. The recessed portions A are portions having a thickness that is thinner than that of the protruding portion B. Thus, the opening 142 provided in the recessed portion A rather than the protruding portion B may facilitate the moldability of the bottom plate 140, thereby improving productivity of the battery module 100.

The battery module 100, in one embodiment, may further include barriers 150 (see FIG. 2) respectively interposed between adjacent battery cells 10 of the plurality of battery cells 10. At least one of the openings 142 may be provided at a location in the bottom plate 140 corresponding to a position of the barrier 150.

The battery cell 10 may generate heat in a charging/discharging process thereof, and the generation of heat may cause deterioration of the battery cell 10. Particularly, in a case where the battery cell 10 is a high-capacity battery cell, the generation of heat may be problematic to the safety of the battery cell 10, and, therefore, it is desirable to control the generation of heat. Accordingly, in one embodiment, the barriers 150 are interposed between the respective neighboring battery cells 10 such that a space may be provided between the neighboring battery cells 10. The space may serve as a path for dissipating heat or a path for coolant for exchanging heat with the battery cells 10 such that the heat generated in the battery cells 10 is not accumulated.

In the battery module 100 according to one embodiment, one or more of the openings 142 are provided in the bottom plate 140. The openings 142 may serve as a path for a coolant, and the coolant flowed through the openings 142 may exchange heat with the battery cells 10, thereby improving the performance of the battery module 100. Accordingly, in one embodiment, the openings 142 are provided at positions corresponding to the barriers 150.

The bottom plate 140 of the battery module 100 may be manufactured using a material with a high strength, such as steel, so as to support the weight of the plurality of battery cells 10. However, steel or the like may be heavy due to the characteristic of the material itself. Further, using steel or the like, it may be difficult to manufacture a battery module having a desired shape, and therefore, the production cost of the battery module may be increased.

Therefore, according to an embodiment of the present invention, the material of the bottom plate 140 may include a plastic material (e.g., a thermoplastic), for example. The bottom plate 140 includes the pattern structure 140a, and accordingly, high strength is provided to compensate for a low strength of a plastic material or the like due to the characteristic of the material itself. In one embodiment, the pattern structure 140a may include a honeycomb structure.

For example, in one embodiment, the pattern structure 140a is a repetitive pattern structure, such as the honeycomb structure and the like, and is structurally strong, such that the pattern structure 140a reinforces the strength of a lightweight material or a material having low strength. Therefore, the bottom plate 140 including the pattern structure 140a has strength sufficient to support the weight of the battery cells 10 without using a high-strength material such as steel.

The pattern structure 140a, in one embodiment, may be provided on a surface opposite to the top surface 144 of the bottom plate 140 which supports the battery cells 10. That is, the pattern structure 140a, in one embodiment, is provided on a bottom surface of the bottom plate 140, as shown in FIG. 3B. In another embodiment, a pattern structure may be provided on the top surface 144 of the bottom plate 140; however, an assembly material or a component may be inserted into the pattern structure on the top surface 144 and may required an additional process for removing the assembly material. Therefore, in one embodiment, the pattern structure 140a is provided to an outer surface of the bottom plate 140, i.e. a bottom surface of the battery module 100 to avoid such a problem and to obtain the high strength and light weight of the battery module 100 having the pattern structure 140a.

Battery modules according to other embodiments of the present invention are described below with reference to FIGS. 4A through 6C. In FIGS. 4A through 6C, description of components and features of the battery modules which are the same or similar to those of the battery module 100 described above will not be repeated.

Figure 4A:
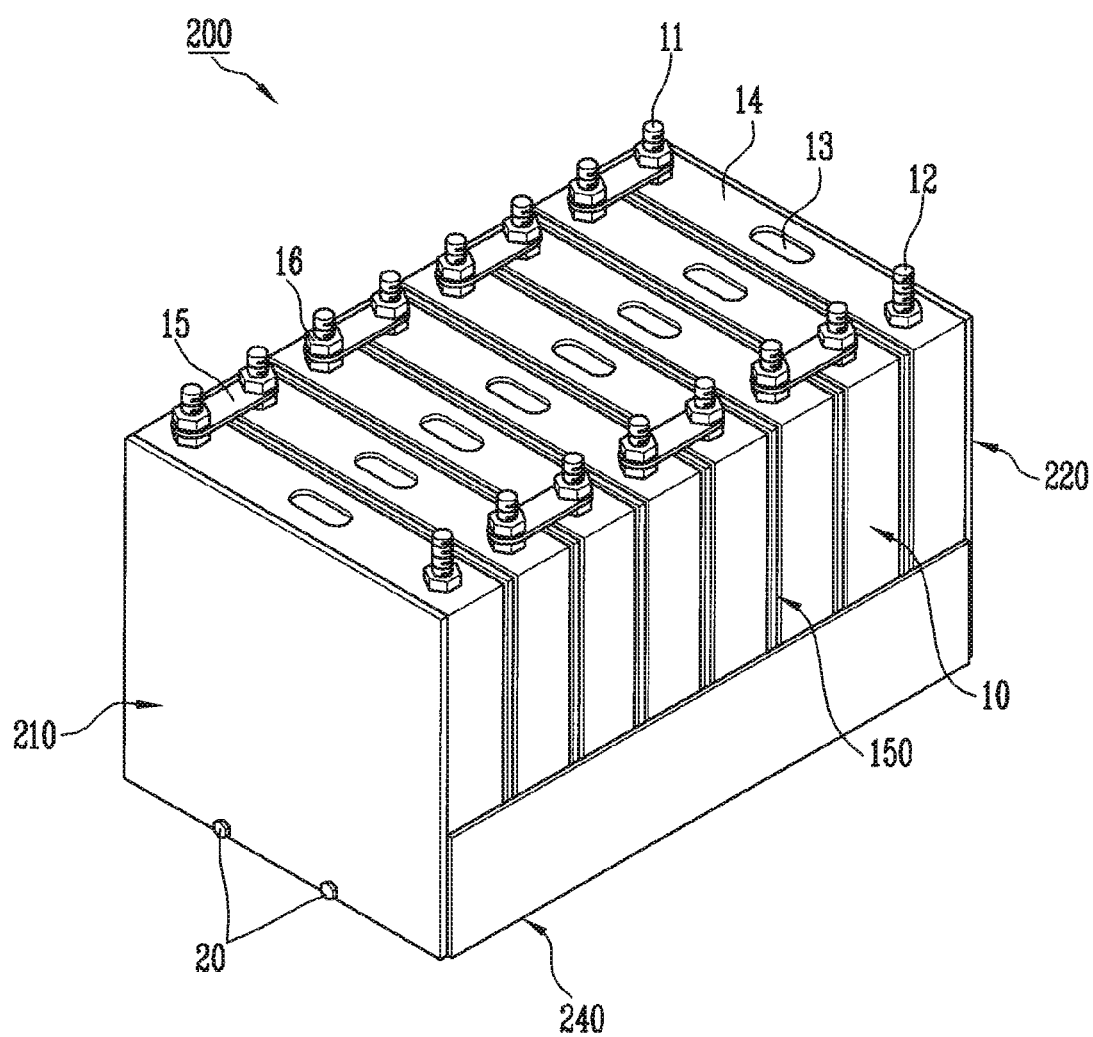
FIG. 4A is a perspective view of a battery module according to another embodiment of the present invention.
Figure 4B:
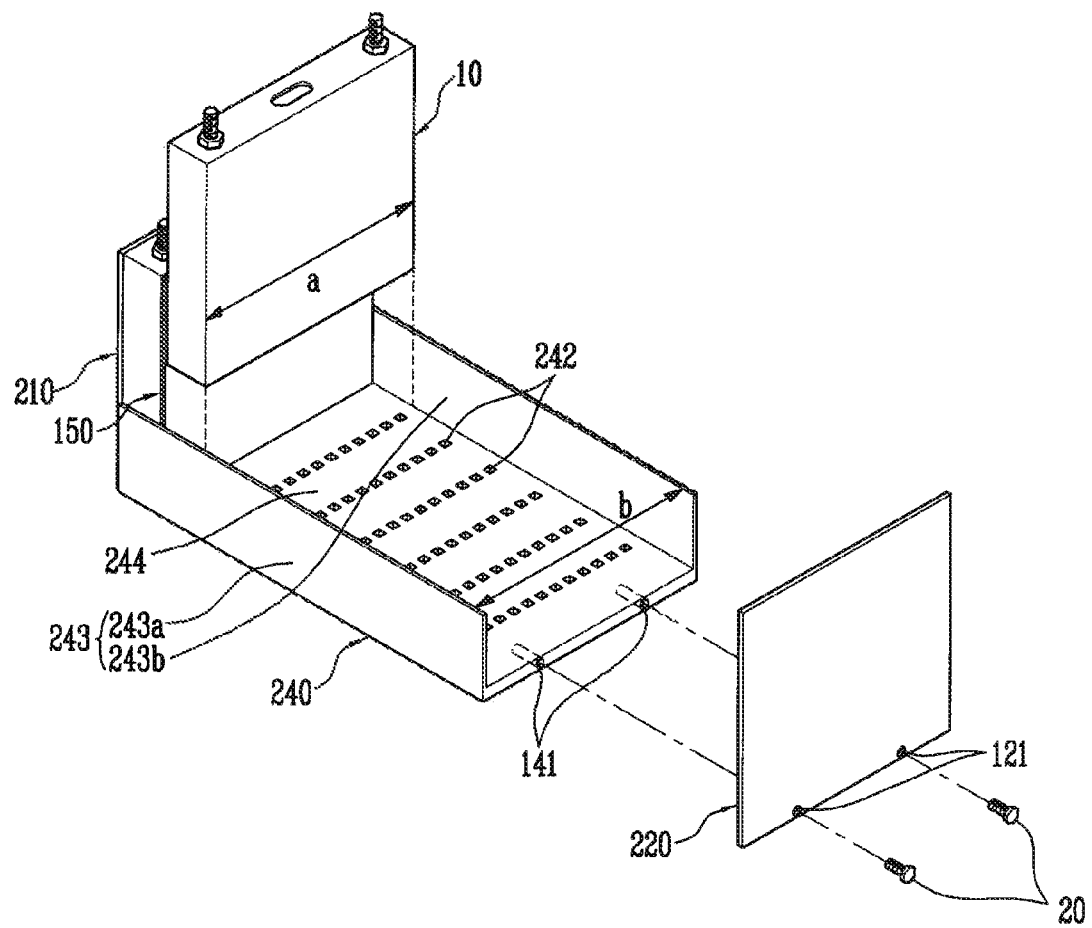
FIG. 4B is a partially exploded perspective view of some components of the battery module of FIG. 4A.
Figure 4C:
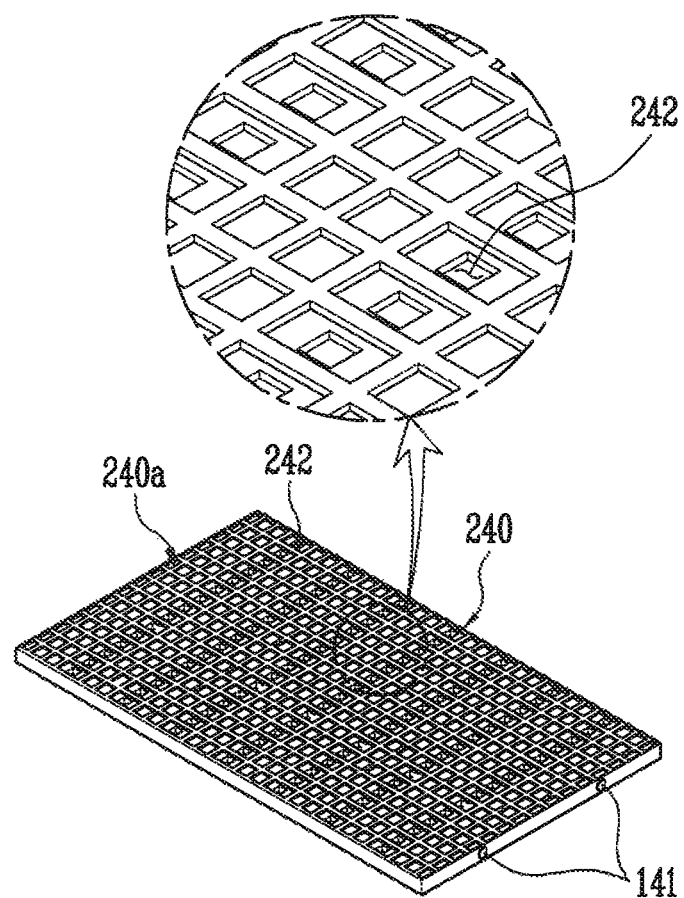
FIG. 4C is a bottom perspective view of a bottom plate of the battery module of FIG. 4A.

FIG. 4A is a perspective view of a battery module 200 according to another embodiment of the present invention. FIG. 4B is a partially exploded perspective view showing some components, including end plates and a bottom plate, of the battery module 200. FIG. 4C is a bottom perspective view of the bottom plate of the battery module 200.

Referring to FIGS. 4A through 4C, the battery module 200 according to one embodiment may include a plurality of battery cells 10 aligned in one direction; first and second end plates 210 and 220 respectively disposed at outsides of the battery cells 10; and a bottom plate 240 that supports bottom surfaces of the battery cells 10 and has at least a portion formed into a pattern structure 240a.

The bottom plate 240 may include a base portion 244 disposed to support the bottom surfaces of the battery cells 10, and at least one flange portion 243 extending at an angle (e.g., bent at an angle) from at least one side of the base portion 244 to support side surfaces of the battery cells 10.

The base portion 244 is provided to come in contact with lower portions (e.g., bottom corners) of the first and second end plates 210 and 220 such that the base portion 244 may support the plurality of battery cells 10. The pattern structure 240a, in one embodiment, may be provided on a surface opposite to the top surface of the base portion 244 which supports the battery cells 10. That is, in one embodiment, the pattern structure 240a is provided on a bottom surface of the base portion 244, as shown in FIG. 4C. The pattern structure 240a may have a same or similar configuration as the pattern structure 140a described above. That is, in one embodiment, the pattern structure 240a may include one or more recessed portions A (e.g., concave portions) provided on a bottom surface of the base portion 244 and one or more protruding portions B (e.g., pillar portions) provided around, such as surrounding, an outer circumference of one or more of the recessed portions A. Further, in one embodiment, the bottom plate 240 may have one or more openings 242, and the openings 242 may be provided in one or more of the recessed portions A of the pattern structure 240a. Because of the characteristic of the pattern structure 240a, the battery module 200 may have light weight and high strength.

The flange portion 243, in one embodiment, may be bent approximately perpendicular to the base portion 244. The flange portion 243 may include first and second flange portions 243a and 243b respectively provided at both sides of the base portion 244. The first and second flange portions 243a and 243b may extend between the first and second end plates 210 and 220 so as to overlap at least a portion of the side surfaces of the battery cells 10.

In one embodiment, a distance "b" (see FIG. 4B) between the first and second flange portions 243a and 243b corresponds to a width "a" of a wide surface (e.g., a front face) of the battery cell 10. Thus, in one embodiment, the bottom plate 240 surrounds the bottom surfaces and portions of both the side surfaces of the battery cells 10 mounted on the bottom plate 240. That is, the first and second flange portions 243a and 243b are provided to surround both the side surfaces of the battery cells 10, such that a process of aligning the battery cells 10 can be easily performed. Further, in one embodiment, the first and second flange portions 243a and 243b block side portions of the plurality of battery cells 10 such that it is possible to prevent or substantially prevent the battery cells 10 from being separated in a direction of the battery module 200. Thus, in the battery module 200, a connecting member, such as the connecting member 130 described above, may be absent and a weight of the battery module 200 may be decreased.

Figure 5A:
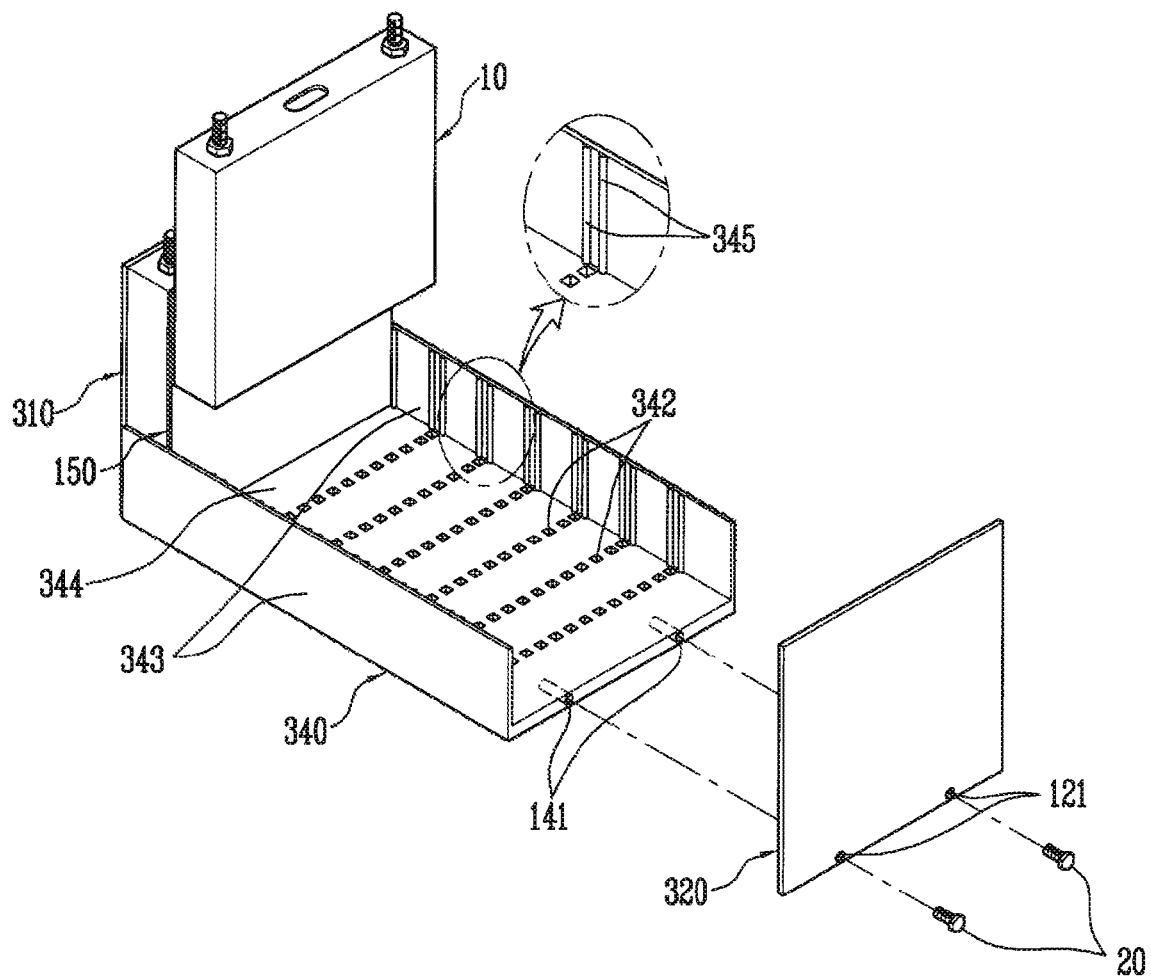
FIG. 5A is partially exploded perspective view of some components of a battery module according to another embodiment of the present invention.
Figure 5B:
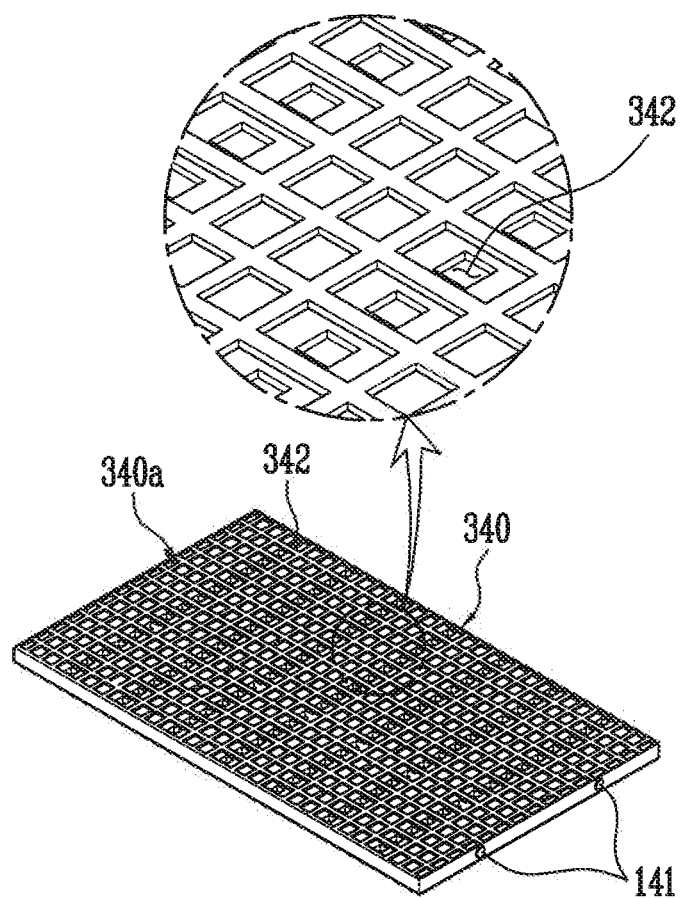
FIG. 5B is a bottom perspective view of a bottom plate of the battery module of FIG. 5A.

FIG. 5A is a partially exploded perspective view showing some components, including end plates and a bottom plate, of a battery module according to another embodiment of the present invention. FIG. 5B is a bottom perspective view of the bottom plate shown in FIG. 5A.

Referring to FIGS. 5A and 5B, a battery module according to another embodiment of the present invention may include a bottom plate 340 and first and second end plates 310 and 320 respectively disposed at outsides of battery cells 10. The bottom plate 340 supports bottom surfaces of the battery cells 10 and has at least a portion formed into a pattern structure 340a. The bottom plate 340, in one embodiment, includes a base portion 344 supporting the bottom surfaces of the battery cells 10, and at least one flange portion 343 extending at an angle (e.g., bent upward) from at least one side of the base portion 344.

The pattern structure 340a may have a same or similar configuration as the pattern structure 140a described above. That is, in one embodiment, the pattern structure 340a may include one or more recessed portions A (e.g., concave portions) provided on a bottom surface of the base portion 344 and one or more protruding portions B (e.g., pillar portions) provided around, such as surrounding, an outer circumference of one or more of the recessed portions A. Further, in one embodiment, the bottom plate 340 may have one or more openings 342, and the openings 342 may be provided in one or more of the recessed portions A of the pattern structure 340a. Because of the characteristic of the pattern structure 340a, a battery module may have light weight and high strength.

In one embodiment, the bottom plate 340 includes one or more guide portions 345 provided to correspond to the battery cell 10 on a surface of the bottom plate 340 which faces or contacts the battery cell 10, so as to guide a position of the battery cell 10. That is, the guide portion 345 may be provided on at least one of the base portion 344 and the flange portions 343. Although it is shown in FIG. 5 that the guide portions 345 are provided only on the flange portion 343, the present invention is not limited thereto.

The guide portions 345 may be provided to protrude from at least one surface of the bottom plate 340 which faces or contacts the battery cells 10. The guide portions 345 may be provided to correspond to the external shape of the battery cell 10 mounted on the bottom plate 340. In the process of manufacturing the battery module according to one embodiment, the guide portions 345 may guide the mounting positions of the battery cells 10. Thus, alignment of the plurality of the battery cells 10 may be facilitated, thereby improving the production efficiency of the battery module.

Figure 6A:
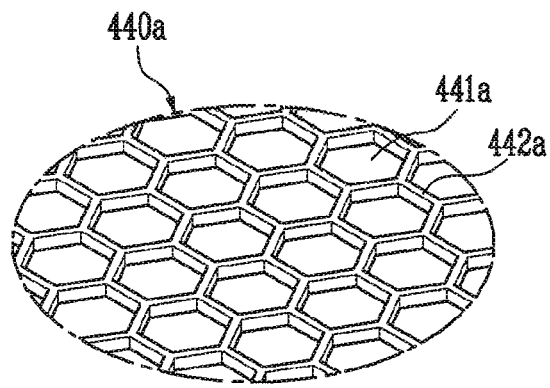
FIG. 6A is a perspective view of a pattern structure of a bottom plate of a battery module according to another embodiment of the present invention.
Figure 6B:
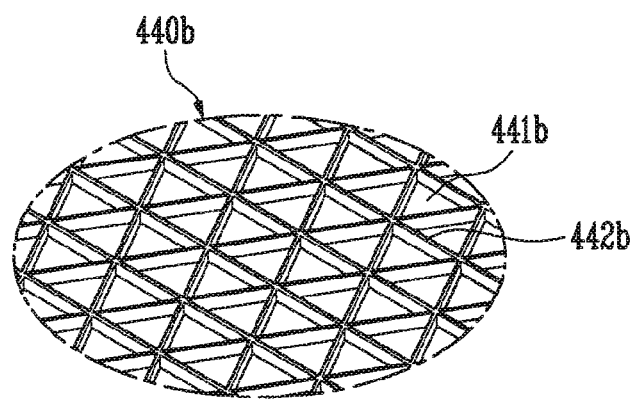
FIG. 6B is a perspective view of a pattern structure of a bottom plate of a battery module according to another embodiment of the present invention.
Figure 6C:
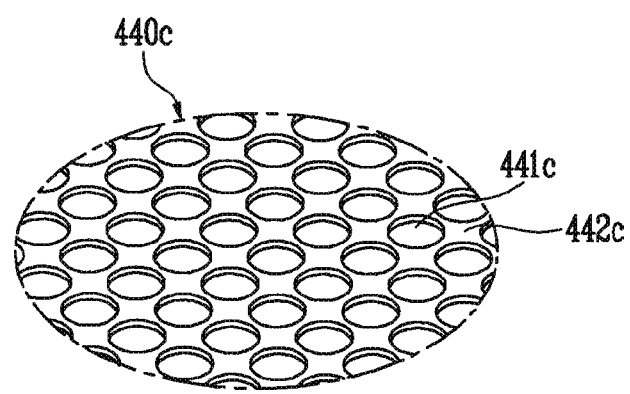
FIG. 6C is a perspective view of a pattern structure of a bottom plate of a battery module according to another embodiment of the present invention.

FIGS. 6A to 6C are perspective views of pattern structures of a bottom plate according to other embodiments of the present invention.

Referring to FIGS. 6A to 6C, according to other embodiments of the present invention, a pattern structure provided on a bottom plate of a battery module may be formed in at least one of a hexagonal shape, a triangular shape, and a circular shape, in addition to a square or rectangular shape. Further, the present invention is not limited thereto and, in other embodiments, a bottom plate of a battery module may have a pattern structure including any other suitable shape or combination of shapes of openings, recesses, and/or protruding portions. With reference to FIG. 6A, a pattern structure 440a includes a pattern (e.g., a repetitive pattern) of one or more hexagonal recessed portions 441a (e.g., concave portions) and one or more protruding portions 442a (e.g., pillar portions) provided around, such as surrounding, an outer circumference of one or more of the hexagonal recessed portions 441a. With reference to FIG. 6B, a pattern structure 440b includes a pattern (e.g., a repetitive pattern) of one or more triangular recessed portions 441b (e.g., concave portions) and one or more protruding portions 442b (e.g., pillar portions) provided around, such as surrounding, an outer circumference of one or more of the triangular recessed portions 441b. With reference to FIG. 6C, a pattern structure 440c includes a pattern (e.g., a repetitive pattern) of one or more circular recessed portions 441c (e.g., concave portions) and one or more protruding portions 442c (e.g., pillar portions) provided around, such as surrounding, an outer circumference of one or more of the circular recessed portions 441c. The pattern structure 440a, 440b, or 440c provided to the bottom plate can maintain the light weight and high strength of a bottom plate of a battery module according to embodiments of the present invention. Further, a bottom plate of a battery module having one of the pattern structures 440a, 440b, or 440c may have one or more openings (not shown), similar to the openings 142 described above, provided in one or more of the recessed portions of the pattern structure 440a, 440b, or 440c. The pattern structure 440a, 440b, or 440c may be provided at a portion exposed on an outer surface of the battery module, and the external appearance of the battery module may be influenced by the pattern structure 440a, 440b, or 440c. The pattern structures 440a, 440b, and 440c enable the design of the battery module to be variously implemented.

As described above, a battery module according to embodiments of the present invention includes a novel plate member, thereby decreasing the size and/or weight of the battery module. As such, battery modules according to embodiments of the present invention are particularly applicable as a motor-driving power source for propelling hybrid vehicles or electric vehicles. Further, a battery module according to embodiments of the present invention has improved productivity due to a manufacturing process thereof.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A battery module comprising:
a plurality of battery cells aligned in a direction;
first and second end plates respectively arranged at outer sides of the plurality of battery cells;
a bottom plate supporting bottom surfaces of the battery cells and comprising at least a portion including a pattern structure, the pattern structure including at least one recessed portion on a second surface of the bottom plate opposite a first surface of the bottom plate which faces the bottom surfaces of the battery cells, and at least one opening formed through the at least one recessed portion; and
a barrier between adjacent battery cells of the plurality of battery cells, wherein the at least one opening is at a location corresponding to the barrier.

2. The battery module according to claim 1, wherein the bottom plate comprises a plastic material.

3. The battery module according to claim 1, wherein the pattern structure comprises a honeycomb structure.

4. The battery module according to claim 1, wherein the pattern structure further includes a protruding portion surrounding an outer circumference of the at least one recessed portion.

5. The battery module according to claim 1, wherein the bottom plate comprises a base portion facing the bottom surfaces of the battery cells, and at least one flange portion extending at an angle from at least one side of the base portion and facing side surfaces of the battery cells.

6. The battery module according to claim 5,
wherein the at least one flange portion comprises first and second flange portions respectively extending from opposite sides of the base portion, and
wherein the first and second flange portions extend between the first and second end plates and overlap at least portions of the side surfaces of the battery cells.

7. The battery module according to claim 1, wherein the at least one recessed portion has at least one of a hexagonal shape, a triangular shape, a rectangular shape, or a circular shape.

8. The battery module according to claim 1, wherein the pattern structure comprises a repetitive pattern structure.

9. The battery module according to claim 1,
wherein the bottom plate comprises a guide portion at a location corresponding to a position of a battery cell of the plurality of battery cells, and
wherein the guide portion faces the battery cell to guide the battery cell into the position.

10. The battery module according to claim 1,
wherein at least one of the first and second endplates has a first fastening hole at a portion that contacts an end of the bottom plate, and
wherein the bottom plate has a second fastening hole at a location corresponding to the first fastening hole.

11. The battery module according to claim 10, further comprising fastening members in the first and second fastening holes and fastening the first and second end plates to the bottom plate.

12. The battery module according to claim 11, wherein the fastening members comprise bolts or studs.

13. The battery module according to claim 1, further comprising a connecting member connecting the first and second end plates to each other.

14. The battery module according to claim 13, wherein the connecting member comprises side plates respectively supporting opposite side surfaces of the battery cells.

* * * * *